US012170981B2

(12) United States Patent
Guo et al.

(10) Patent No.: US 12,170,981 B2
(45) Date of Patent: Dec. 17, 2024

(54) RESOURCE ALLOCATION METHOD AND APPARATUS

(71) Applicant: HUAWEI TECHNOLOGIES CO., LTD., Shenzhen (CN)

(72) Inventors: Yuchen Guo, Shenzhen (CN); Peter Loc, Cupertino, CA (US)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 419 days.

(21) Appl. No.: 17/484,477

(22) Filed: Sep. 24, 2021

(65) Prior Publication Data

US 2022/0015074 A1    Jan. 13, 2022

Related U.S. Application Data

(63) Continuation of application No. PCT/CN2020/081297, filed on Mar. 26, 2020.

(30) Foreign Application Priority Data

Mar. 26, 2019   (CN) .......................... 201910234653.9

(51) Int. Cl.
*H04W 72/04*   (2023.01)
(52) U.S. Cl.
CPC .................................. *H04W 72/04* (2013.01)
(58) Field of Classification Search
None
See application file for complete search history.

(56) References Cited

U.S. PATENT DOCUMENTS

| | | | | |
|---|---|---|---|---|
| 10,692,083 | B2* | 6/2020 | Todasco | H04M 3/42059 |
| 11,895,682 | B2* | 2/2024 | Hedayat | H04W 74/006 |
| 2017/0184698 | A1* | 6/2017 | Rueth | G09G 3/006 |
| 2017/0280462 | A1 | 9/2017 | Chun et al. | |
| 2017/0303164 | A1* | 10/2017 | Chu | H04L 45/66 |
| 2017/0303280 | A1 | 10/2017 | Chun et al. | |
| 2017/0325178 | A1* | 11/2017 | Verma | H04W 74/04 |

(Continued)

FOREIGN PATENT DOCUMENTS

| | | |
|---|---|---|
| CN | 102484793 A | 5/2012 |
| CN | 107079431 A | 8/2017 |

(Continued)

OTHER PUBLICATIONS

3rd Generation Partnership Project; Technical Specification Group Radio Access Network;Study on New Radio (NR) Access Technology; Physical Layer Aspects(Release 14),2017, total: 134pages.

(Continued)

*Primary Examiner* — Phirin Sam
(74) *Attorney, Agent, or Firm* — HAUPTMAN HAM, LLP

(57) ABSTRACT

A resource allocation method includes generating a first frame and sending the first frame. The first frame includes a plurality of user information fields. Each user information field of the plurality of user information fields includes one user identifier subfield and is used to allocate a resource to a user identified by the user identifier subfield. Two or more user information fields in the plurality of user information fields have corresponding values of corresponding user identifier subfields that are the same.

20 Claims, 8 Drawing Sheets

(56) References Cited

U.S. PATENT DOCUMENTS

| | | | |
|---|---|---|---|
| 2019/0007973 A1* | 1/2019 | Lou | H04W 74/0816 |
| 2019/0007977 A1 | 1/2019 | Asterjadhi et al. | |
| 2019/0238195 A1* | 8/2019 | Liu | H04L 1/0009 |
| 2019/0238288 A1* | 8/2019 | Liu | H04L 1/0059 |
| 2019/0357256 A1* | 11/2019 | Kim | H04W 72/0446 |
| 2019/0379500 A1* | 12/2019 | Hu | H04B 7/0452 |
| 2020/0396742 A1* | 12/2020 | Park | H04W 76/11 |
| 2020/0396743 A1* | 12/2020 | Park | H04W 76/11 |
| 2021/0127333 A1* | 4/2021 | Park | H04L 27/02 |
| 2021/0289554 A1* | 9/2021 | Lou | H04W 74/0816 |
| 2022/0166573 A1* | 5/2022 | Chitrakar | H04L 1/188 |
| 2022/0312428 A1* | 9/2022 | Hedayat | H04L 27/2602 |
| 2022/0345550 A1* | 10/2022 | Josiam | H04L 5/0023 |
| 2023/0155793 A1* | 5/2023 | Seok | H04L 1/1607 370/338 |
| 2024/0040505 A1* | 2/2024 | Park | H04W 74/0816 |
| 2024/0188140 A1* | 6/2024 | Noh | H04W 74/006 |

FOREIGN PATENT DOCUMENTS

| | | |
|---|---|---|
| CN | 107925470 A | 4/2018 |
| CN | 111756491 B | 4/2023 |
| WO | 2016045092 A1 | 3/2016 |

OTHER PUBLICATIONS

IEEE P802.11ax /D2.2, Feb. 2018, Draft Standard for Information technology—Telecommunications and Information exchange between systems Local and metropolitan area networks—Specific requirements—Part 11: Wireless AN Medium Access Control(MAC) and Physical Layer (PHY) Specifications, Amendment 6: Enhancements for High Efficiency WLAN. 620 pages.

IEEE Std 802.11a-1999 (Supplement to IEEE Std 802.Nov. 1999, Supplement to IEEE Standard for Information technology Telecommunications and information exchange between systems Local and metropolitan area networks Specific requirements Part 11: Wireless LAN Medium Access Control (MAC) and Physical Layer (PHY) specifications: High-speed Physical Layer in the 5 GHZ Band, LAN/MAN Standards Committee of the IEEE Computer Society, Sep. 1999, 90 pages.

IEEE Std 802.11g-2003, IEEE Standard for Information technology Telecommunications and information exchange between systems Local and metropolitan area networks Specific requirements, Part 11: Wireless LAN Medium Access Control (MAC) and Physical Layer (PHY) specifications, Amendment 4: Further Higher Data RateExtension in the 2.4 GHz Band, LAN/MAN Standards Committee of the IEEE Computer Society, Approved Jun. 12, 2003, 77 pages.

802.11n-2009—IEEE Standard for Information technology—Local and metropolitan area networks—Specific requirements—Part 11: Wireless LAN Medium Access Control (MAC)and Physical Layer (PHY) Specifications Amendment 5: Enhancements for Higher Throughput, Oct. 2009, 536 pages.

IEEE Std 802.11ac-2013, IEEE Standard for Information technology Telecommunications and information exchange between systemsLocal and metropolitan area networks Specific requirements, Part 11: Wireless LAN Medium Access Control (MAC) and Physical Layer (PHY) Specifications, Amendment 4: Enhancements for Very HighThroughput for Operation in Bands below 6 Ghz, IEEE Computer Society, 2013, 425 pages.

International Search Report issued in corresponding International Application No. PCT/CN2020/081297, dated May 27, 2020, pp. 1-10.

* cited by examiner

| Legacy short training field | Legacy long training field | Legacy signal field | Repeated legacy signal field | High efficiency signal field A | High efficiency signal field B | High efficiency short training field | High efficiency long training field | ... | Data field | Packet extension field |

FIG. 4

RESOURCE ALLOCATION METHOD AND APPARATUS

CROSS-REFERENCE TO RELATED APPLICATIONS

This application is a continuation of International Application No. PCT/CN2020/081297, filed on Mar. 26, 2020, which claims priority to Chinese Patent Application No. 201910234653.9, filed on Mar. 26, 2019. The disclosures of the aforementioned applications are hereby incorporated by reference in their entireties.

TECHNICAL FIELD

Embodiments of this application relate to the communications field, and in particular, to a resource allocation method and apparatus in the communications field.

BACKGROUND

In recent years, as WLAN wireless devices increase exponentially, a requirement for a WLAN wireless communication rate is also increasingly high. During the evolution from 802.11a to 802.11g, 802.11n, and 802.11ac, and to 802.11ax, a maximum communication rate supported by a system is also increasingly high. In addition, an OFDMA technology is further introduced in 802.11ax. After the OFDMA technology is introduced, how to allocate a proper communication resource to each user to improve communication robustness becomes an urgent problem to be resolved at present.

SUMMARY

Embodiments of this application provide a resource allocation method and apparatus. A plurality of communication resources at different locations are allocated to a same user. In particular, the user transmits (sends or receives) same data on the plurality of different communication resources. This can improve data transmission robustness.

According to a first aspect, an embodiment of this application provides a resource allocation method, where the method includes:
generating a first frame, where the first frame includes a plurality of user information fields, each user information field includes one user identifier subfield and is used to allocate a resource to a user identified by the user identifier subfield, and the plurality of user information fields include user information fields whose user identifier subfield values are the same; and
sending the first frame.

According to this embodiment of this application, the plurality of user information fields in the first frame include the user information fields whose user identifier subfield values are the same, so that a plurality of resources at different locations are allocated to a same user.

In a possible implementation of the first aspect, locations of the user information fields whose user identifier subfield values are the same are contiguous, so that the user ends reading of the first frame as soon as possible, and starts to prepare for data transmission.

In a possible implementation of the first aspect, the first frame is an HE MU PPDU, the HE MU PPDU includes an HE-SIG-B field, and the HE-SIG-B field includes a plurality of user information fields, and each user information field includes a user identifier subfield, each user information field is used to allocate a resource to a user identified by the user identifier subfield, and the plurality of user information fields include user information fields whose user identifier subfield values are the same.

Further, the user information field further carries second indication information, and the second indication information is used to indicate to send same data to a same user on resources at different locations. The second indication information is used to indicate the user to transmit (send or receive) the same data on a plurality of different resources. This can improve data transmission robustness.

Further, the second indication information is located in an MCS subfield of the user information field.

Further, the HE-SIG-B field further includes a resource allocation subfield, and resources indicated by resource allocation subfields corresponding to the user information fields whose user identifier subfield values are the same have a same size.

In a possible implementation of the first aspect, the first frame is a trigger frame, the trigger frame includes a plurality of user information fields, each user information field includes a user identifier subfield, and each user information field is used to allocate a resource to a user identified by the user identifier subfield, and the plurality of user information fields include user information fields whose user identifier subfield values are the same.

Further, the user information field carries fourth indication information, and the fourth indication information is used to indicate a user to send same data by using a plurality of resources at different locations.

Further, the fourth indication information is located in a reserved subfield of the user information field.

Further, the fourth indication information is located in an MCS subfield of the user information field.

Further, the fourth indication information is located in an SS Allocation subfield of the user information field.

Further, the fourth indication information is located in a Target RSSI subfield of the user information field.

Further, the fourth indication information is located in a Trigger Dependent User Info subfield (subfield) of the user information field.

Further, the user information field further includes a resource allocation subfield, and resources indicated by resource allocation subfields in the user information fields whose user identifier subfield values are the same have a same size.

According to a second aspect, an embodiment of this application provides a resource allocation method, where the method includes:
receiving a first frame, where the first frame includes a plurality of user information fields, each user information field includes one user identifier subfield and is used to allocate a resource to a user identified by the user identifier subfield, and the plurality of user information fields include user information fields whose user identifier subfield values are the same; and
transmitting data on the allocated resource.

According to this embodiment of this application, the plurality of user information fields in the first frame include the user information fields whose user identifier subfield values are the same. To be specific, a transmit end allocates a plurality of resources at different locations to a same user, and a receive end transmits data on the plurality of allocated resources at different locations.

In a possible implementation of the second aspect, locations of the user information fields whose user identifier subfield values are the same are contiguous, so that the user ends reading of the first frame as soon as possible, and starts to prepare for data transmission.

In a possible implementation of the second aspect, the first frame is an HE MU PPDU, the HE MU PPDU includes an HE-SIG-B field, the HE-SIG-B field includes a plurality of user information fields, each user information field includes a user identifier subfield and is used to allocate a resource to a user identified by the user identifier subfield, and the plurality of user information fields include user information fields whose user identifier subfield values are the same.

Further, the user information field further carries second indication information, and the second indication information is used to indicate to send same data to a same user on resources at different locations. The second indication information is used to indicate the user to transmit (send or receive) the same data on a plurality of different resources. This can improve data transmission robustness.

Further, the second indication information is located in an MCS subfield of the user information field.

Further, the HE-SIG-B field further includes a resource allocation subfield, and resources indicated by resource allocation subfields corresponding to the user information fields whose user identifier subfield values are the same have a same size.

In a possible implementation of the second aspect, the first frame is a trigger frame, the trigger frame includes a plurality of user information fields, each user information field includes a user identifier subfield and is used to allocate a resource to a user identified by the user identifier subfield, and the plurality of user information fields include user information fields whose user identifier subfield values are the same.

Further, the user information field carries fourth indication information, and the fourth indication information is used to indicate a user to send same data by using a plurality of resources at different locations.

Further, the fourth indication information is located in a reserved subfield of the user information field.

Further, the fourth indication information is located in an MCS subfield of the user information field.

Further, the fourth indication information is located in an SS Allocation subfield of the user information field.

Further, the fourth indication information is located in a Target RSSI subfield of the user information field.

Further, the fourth indication information is located in a Trigger Dependent User Info subfield (subfield) of the user information field.

Further, the user information field further includes a resource allocation subfield, and resources indicated by resource allocation subfields in the user information fields whose user identifier subfield values are the same have a same size.

According to a third aspect, an embodiment of this application provides a resource allocation apparatus, where the apparatus includes:
  a generation unit, configured to generate a first frame, where the first frame includes a plurality of user information fields, each user information field includes one user identifier subfield and is used to allocate a resource to a user identified by the user identifier subfield, and the plurality of user information fields include user information fields whose user identifier subfield values are the same; and
  a sending unit, configured to send the first frame.

According to this embodiment of this application, the plurality of user information fields in the first frame include the user information fields whose user identifier subfield values are the same, so that a plurality of resources at different locations are allocated to a same user.

In a possible implementation of the third aspect, locations of the user information fields whose user identifier subfield values are the same are contiguous, so that the user ends reading of the first frame as soon as possible, and starts to prepare for data transmission.

In a possible implementation of the third aspect, the first frame is an HE MU PPDU, the HE MU PPDU includes an HE-SIG-B field, and the HE-SIG-B field includes a plurality of user information fields, each user information field includes a user identifier subfield and is used to allocate a resource to a user identified by the user identifier subfield, and the plurality of user information fields include user information fields whose user identifier subfield values are the same.

Further, the user information field further carries second indication information, and the second indication information is used to indicate to send same data to a same user on resources at different locations. The second indication information is used to indicate the user to transmit (send or receive) the same data on a plurality of different resources. This can improve data transmission robustness.

Further, the second indication information is located in an MCS subfield of the user information field.

Further, the HE-SIG-B field further includes a resource allocation subfield, and resources indicated by resource allocation subfields corresponding to the user information fields whose user identifier subfield values are the same have a same size.

In a possible implementation of the third aspect, the first frame is a trigger frame, the trigger frame includes a plurality of user information fields, each user information field includes a user identifier subfield and is used to allocate a resource to a user identified by the user identifier subfield, and the plurality of user information fields include user information fields whose user identifier subfield values are the same.

Further, the user information field carries fourth indication information, and the fourth indication information is used to indicate a user to send same data by using a plurality of resources at different locations.

Further, the fourth indication information is located in a reserved subfield of the user information field.

Further, the fourth indication information is located in an MCS subfield of the user information field.

Further, the fourth indication information is located in an SS Allocation subfield of the user information field.

Further, the fourth indication information is located in a Target RSSI subfield of the user information field.

Further, the fourth indication information is located in a Trigger Dependent User Info subfield (subfield) of the user information field.

Further, the user information field further includes a resource allocation subfield, and resources indicated by resource allocation subfields in the user information fields whose user identifier subfield values are the same have a same size.

According to a fourth aspect, an embodiment of this application provides a resource allocation apparatus, where the apparatus includes:
  a receiving unit, configured to receive a first frame, where the first frame includes a plurality of user information fields, each user information field includes one user identifier subfield and is used to allocate a resource to a user identified by the user identifier subfield, and the plurality of user information fields include user information fields whose user identifier subfield values are the same; and a processing unit, configured to schedule a user to transmit data on an allocated resource.

According to this embodiment of this application, the plurality of user information fields in the first frame include the user information fields whose user identifier subfield values are the same. To be specific, a transmit end allocates a plurality of resources at different locations to a same user, and a receive end transmits data on the plurality of allocated resources at different locations.

In a possible implementation of the fourth aspect, locations of the user information fields whose user identifier subfield values are the same are contiguous, so that the user ends reading of the first frame as soon as possible, and starts to prepare for data transmission.

In a possible implementation of the fourth aspect, the first frame is an HE MU PPDU, the HE MU PPDU includes an HE-SIG-B field, the HE-SIG-B field includes a plurality of user information fields, each user information field includes a user identifier subfield and is used to allocate a resource to a user identified by the user identifier subfield, and the plurality of user information fields include user information fields whose user identifier subfield values are the same.

Further, the user information field further carries second indication information, and the second indication information is used to indicate to send same data to a same user on resources at different locations. The second indication information is used to indicate the user to transmit (send or receive) the same data on a plurality of different resources. This can improve data transmission robustness.

Further, the second indication information is located in an MCS subfield of the user information field.

Further, the HE-SIG-B field further includes a resource allocation subfield, and resources indicated by resource allocation subfields corresponding to the user information fields whose user identifier subfield values are the same have a same size.

In a possible implementation of the fourth aspect, the first frame is a trigger frame, the trigger frame includes a plurality of user information fields, each user information field includes a user identifier subfield and is used to allocate a resource to a user identified by the user identifier subfield, and the plurality of user information fields include user information fields whose user identifier subfield values are the same.

Further, the user information field carries fourth indication information, and the fourth indication information is used to indicate a user to send same data by using a plurality of resources at different locations.

Further, the fourth indication information is located in a reserved subfield of the user information field.

Further, the fourth indication information is located in an MCS subfield of the user information field.

Further, the fourth indication information is located in an SS Allocation subfield of the user information field.

Further, the fourth indication information is located in a Target RSSI subfield of the user information field.

Further, the fourth indication information is located in a Trigger Dependent User Info subfield (subfield) of the user information field.

Further, the user information field further includes a resource allocation subfield, and resources indicated by resource allocation subfields in the user information fields whose user identifier subfield values are the same have a same size.

According to a fifth aspect, an embodiment of this application provides a resource allocation apparatus, where the apparatus includes a processor and a transceiver that is internally connected to and communicates with the processor. The processor is configured to generate a first frame, where the first frame includes a plurality of user information fields, each user information field includes one user identifier subfield and is used to allocate a resource to a user identified by the user identifier subfield, and the plurality of user information fields include user information fields whose user identifier subfield values are the same. The transceiver is configured to send the first frame.

The resource allocation apparatus provided in the fifth aspect is configured to perform the first aspect or any possible implementation of the first aspect. For specific details, refer to the first aspect or any possible implementation of the first aspect. Details are not described herein again.

According to a sixth aspect, an embodiment of this application provides a resource allocation apparatus, where the apparatus includes a processor and a transceiver that is internally connected to and communicates with the processor. The transceiver is configured to receive a first frame, where the first frame includes a plurality of user information fields, each user information field includes one user identifier subfield and is used to allocate a resource to a user identified by the user identifier subfield, and the plurality of user information fields include user information fields whose user identifier subfield values are the same. The processor is configured to schedule a user to transmit data on a resource allocated to the user.

The resource allocation apparatus provided in the sixth aspect is configured to perform the second aspect or any possible implementation of the second aspect. For specific details, refer to the second aspect or any possible implementation of the second aspect. Details are not described herein again.

According to a seventh aspect, an embodiment of this application provides a resource allocation apparatus, where the apparatus includes a processing circuit and an output interface that is internally connected to and communicates with the processing circuit. The processing circuit is configured to generate a first frame, where the first frame includes a plurality of user information fields, each user information field includes one user identifier subfield and is used to allocate a resource to a user identified by the user identifier subfield, and the plurality of user information fields include user information fields whose user identifier subfield values are the same. The output interface is configured to send the first frame.

The resource allocation apparatus provided in the seventh aspect is configured to perform the first aspect or any possible implementation of the first aspect. For specific details, refer to the first aspect or any possible implementation of the first aspect. Details are not described herein again.

According to an eighth aspect, an embodiment of this application provides a resource allocation apparatus, where the apparatus includes a processing circuit and an input interface that is internally connected to and communicates with the processing circuit. The input interface is configured to receive a first frame, where the first frame includes a plurality of user information fields, each user information field includes one user identifier subfield and is used to allocate a resource to a user identified by the user identifier subfield, and the plurality of user information fields include user information fields whose user identifier subfield values are the same. The processing circuit is configured to schedule a user to transmit data on a resource allocated to the user.

The resource allocation apparatus provided in the eighth aspect is configured to perform the second aspect or any possible implementation of the second aspect. For specific details, refer to the second aspect or any possible implementation of the second aspect. Details are not described herein again.

According to a ninth aspect, an embodiment of this application provides a computer-readable storage medium, configured to store a computer program, where the computer program includes instructions used to perform the first aspect or any possible implementation of the first aspect.

According to a tenth aspect, an embodiment of this application provides a computer-readable storage medium, configured to store a computer program, where the computer program includes instructions used to perform the second aspect or any possible implementation of the second aspect.

According to an eleventh aspect, an embodiment of this application provides a computer program, where the computer program includes instructions used to perform the first aspect or any possible implementation of the first aspect.

According to a twelfth aspect, an embodiment of this application provides a computer program, where the computer program includes instructions used to perform the second aspect or any possible implementation of the second aspect.

According to a thirteenth aspect, an embodiment of this application provides a communications system, where the communications system includes the resource allocation apparatus provided in the third aspect, the fifth aspect, or the seventh aspect, and the resource allocation apparatus provided in the fourth aspect, the sixth aspect, or the eighth aspect.

BRIEF DESCRIPTION OF DRAWINGS

FIG. 4 shows a frame structure of an HE MU PPDU;

DESCRIPTION OF EMBODIMENTS

The following describes technical solutions in the embodiments of this application with reference to the accompanying drawings in the embodiments of this application.

It should be understood that, the technical solutions of the embodiments of this application may be applied to various communications systems, such as a Wi-Fi wireless communications system, a global system for mobile communications (global system for mobile communications, GSM) system, a code division multiple access (code division multiple access, CDMA) system, a wideband code division multiple access (wideband code division multiple access, WCDMA) system, a general packet radio service (general packet radio service, GPRS) system, a long term evolution (long term evolution, LTE) system, an LTE frequency division duplex (frequency division duplex, FDD) system, an LTE time division duplex (time division duplex, TDD) system, a universal mobile telecommunications system (universal mobile telecommunications system, UMTS), a worldwide interoperability for microwave access (worldwide interoperability for microwave access, WiMAX) communications system, another future evolved system, or other various wireless communications system that uses a radio access technology.

Figure 1:
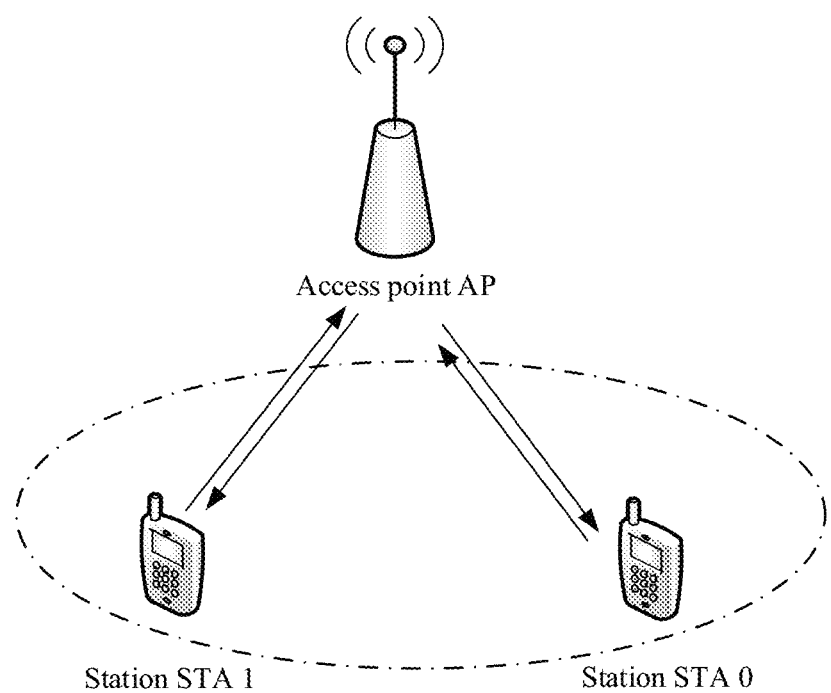
FIG. 1 shows a communications system to which an embodiment of this application is applied.

FIG. 1 shows a communications system to which an embodiment of this application is applied. The communications system includes a network device and at least one terminal device located within coverage of the network device. The network device may provide communication coverage for a specific geographic area, and communicate with a terminal device located in the coverage area. The network device may be a base transceiver station (base transceiver station, BTS) in a GSM system or a code division multiple access (code division multiple access, CDMA) system, may be a NodeB (NodeB, NB) in a WCDMA system, may be an evolved NodeB (evolved NodeB, eNB, or eNodeB) in an LTE system, may be a radio controller in a cloud radio access network (cloud radio access network, CRAN), or may be a relay station, an access point AP, a vehicle-mounted device, a wearable device, a network side device in a future network, or the like. The terminal device may be mobile or fixed, and the terminal device may be a station STA, an access terminal, or user equipment (user equipment, UE), a subscriber unit, a subscriber station, a mobile station, a remote station, a remote terminal, a mobile device, a user terminal, a wireless communication device, a user agent or a user apparatus, or the like.

Embodiments of this application specifically relate to a resource allocation method and apparatus. In the embodiments of this application, a plurality of different communication resources are allocated to a same user. In particular, the user transmits (sends or receives) same data on the plurality of different communication resources. This can improve data transmission robustness.

Figure 2:
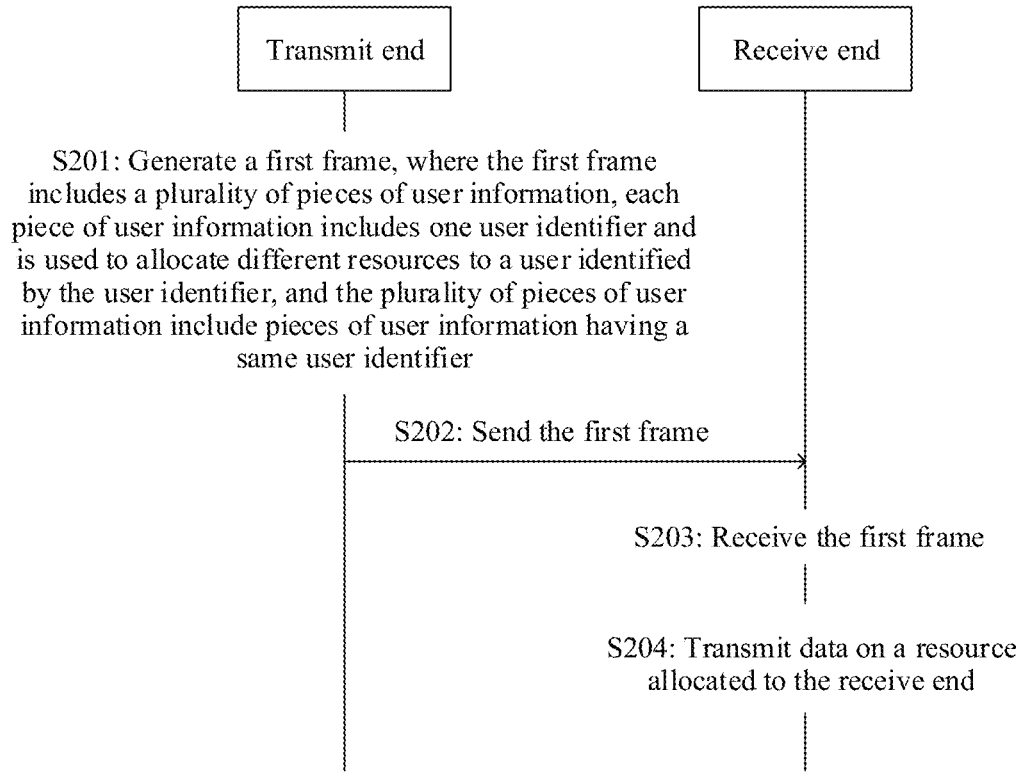
FIG. 2 shows a method according to an embodiment of this application.

FIG. 2 shows a method according to an embodiment of this application. Specifically, a resource allocation method includes the following steps.

S201: A transmit end generates a first frame, where the first frame includes a plurality of user information fields, each user information field includes one user identifier subfield and is used to allocate a resource to a user identified by the user identifier subfield, and the plurality of user information fields include user information fields whose user identifier subfield values are the same.

In S201, in other words, values of user identifier subfields in two or more user information fields in the plurality of user information fields are the same.

In S201, this embodiment of this application may be applied to a scenario in which an access point AP generates a first frame and sends the first frame to a station STA, or may be applied to a scenario in which a first station STA generates a first frame and sends the first frame to a second station STA. This is not limited in this embodiment of this application.

The following describes this embodiment of this application by using an example in which the AP generates the first frame and sends the first frame to the STA. In this embodiment of this application, the AP generates the first frame, where a plurality of communication resources at different locations are allocated to a same STA by using the first frame.

Figure 3:
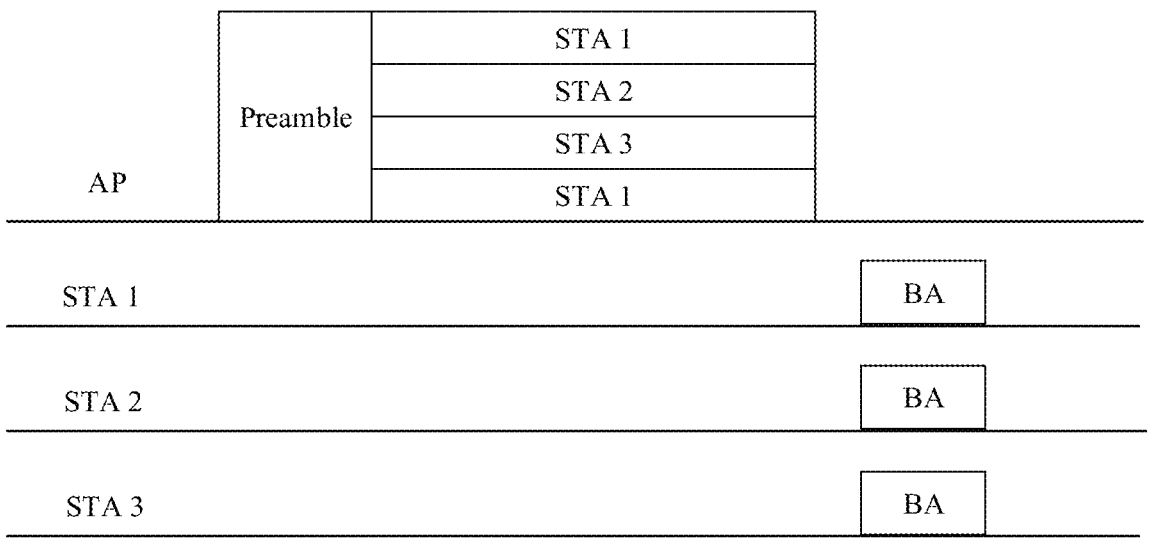
FIG. 3 shows that an AP allocates two RUs to a STA 1 by using an HE MU PPDU.

In a specific embodiment, for example, the AP generates and sends an HE-MU-PPDU, where the HE-MU-PPDU is used to allocate RUs at different locations to STAs. The AP sends downlink data to the STAs on the RUs. Correspondingly, the STAs receive data on the corresponding RUs. In this embodiment of this application, the AP allocates a plurality of RUs at different locations to a same STA. As shown in FIG. 3, the AP allocates a first RU and a fourth RU to a STA 1. Details of this specific embodiment are described below.

The AP generates and sends the HE-MU-PPDU, where the HE MU PPDU includes an HE-SIG-B field, the HE-SIG-B field includes a plurality of user information fields, each user information field includes one STA-ID subfield and is used to allocate resource units (Resource Unit, RU) at different locations to a STA identified by the STA-ID subfield, and the plurality of user information fields included in the HE-MU-PPDU include user information fields with a same STA-ID. For example, the HE-MU-PPDU includes four user information fields, and a value of a STA-ID subfield in a fourth user information field is the same as a value of a STA-ID subfield in a first user information field.

Figure 5:
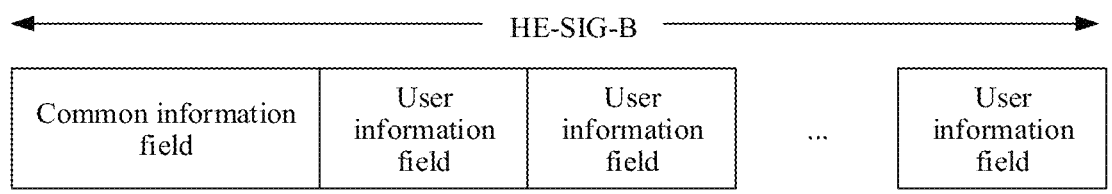
FIG. 5 shows a structure of an HE-SIG-B field.

In this embodiment of this application, the HE-MU-PPDU includes user information fields whose STA-ID subfield values are the same, and each user information field is used to allocate RUs at different locations to the STA identified by the STA-ID subfield. In this way, a plurality of RUs at different locations are allocated to a same STA. Specifically, as shown in FIG. 4, the HE MU PPDU is a physical layer frame format defined in the 802.11ax standard, and includes an L-STF (legacy short training field), an L-LTF (legacy long training field), an L-SIG (legacy signal field), an RL-SIG (repeated legacy signal field), an HE-SIG-A (high efficiency signal field A), an HE-SIG-B (high efficiency signal field B), an HE-STF (high efficiency short training field), an HE-LTF (high efficiency long training field), a data field (data field), and a PE field (packet extension field). As shown in FIG. 5, the HE-SIG-B field includes a common information field and a plurality of user information fields, and the common information field includes a resource unit allocation (RU Allocation) subfield. The RU Allocation subfield is used to indicate resource division. A value of the RU Allocation subfield indicates a resource division pattern. Each user information field in the plurality of user information fields includes one STA-ID subfield, and each user information field is used to allocate different RUs to a STA identified by the STA-ID subfield. Specifically, the plurality of user information fields sequentially sorted are in a one-to-one correspondence with RUs in the resource division pattern indicated by the RU Allocation subfield.

Further, locations of a plurality of user information fields in which a plurality of RUs allocated to a STA are located are contiguous, so that the STA ends reading of the HE-MU-PPDU as soon as possible, and starts to receive data.

Further, in this embodiment of this application, the AP may further indicate to send same data to a same STA on different RUs. Specifically, the user information field carries second indication information, and the second indication information is used to indicate to send same data to a same STA on different RUs. Optionally, the second indication information is located in an MCS subfield of the user information field. In this case, the second indication information is further used to indicate that MCSs used for the AP to send data on different RUs are the same. The same MCS is indicated by MCS subfields in user information fields whose previous or next user identifier subfield values are the same. Specifically, valid values of the MCS subfield are 0 to 11, a length of the MCS subfield is 4 bits, and a range that can be represented is 0 to 15. Therefore, any value in invalid values 12 to 15 of the MCS subfield may be used as the second indication information. To be specific, an MCS subfield whose value is any value in 12 to 15 indicates that data sent on an RU corresponding to a user information field in which the MCS subfield is located is the same as data sent on a previous RU or a next RU allocated to a same STA. In addition, an MCS used for sending the data on the RU corresponding to the user information field in which the MCS subfield whose value is any value in 12 to 15 is located is the same as an MCS used for sending the data on the previous RU or the next RU allocated to the same STA.

Figure 6:
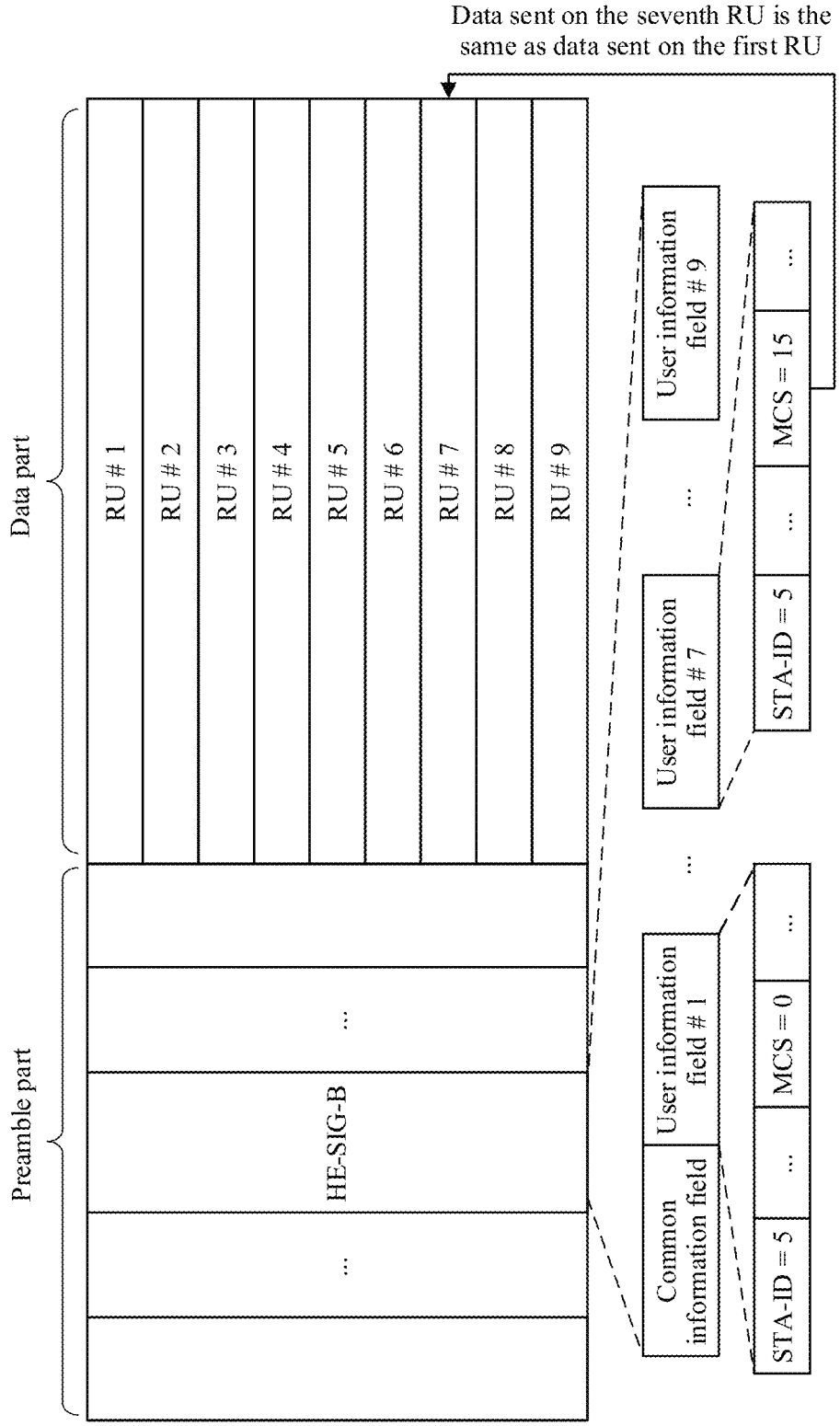
FIG. 6 shows a specific configuration of an HE-SIG-B field.

For example, as shown in FIG. 6, if the AP divides an entire communication resource into nine RUs and allocates a first RU and a seventh RU in the nine RUs to the STA 1, and a value of a STA-ID of the STA 1 is 5, the AP may set values of STA-IDs in a first user information field and a seventh user information field in the HE-SIG-B to 5. Further, a value of a MCS subfield in the seventh user information field is set to 15, to indicate that data sent by the AP on the seventh RU is the same as data sent by the AP on the first RU, and indicate that an MCS used for sending the data on the seventh RU is the same as an MCS used for sending the data on the first RU.

Further, the HE-SIG-B field further includes a resource allocation subfield, and resources indicated by resource allocation subfields corresponding to the user information fields whose user identifier subfield values are the same have a same size.

In addition, the HE-MU-PPDU may further include third indication information, and the third indication information is used to indicate that data carried on a subcarrier of an RU corresponding to the user information field is a mapping of data carried on a subcarrier of the previous RU or the next RU allocated to the same STA. In other words, data subcarriers on the seventh RU may be any arrangement of data subcarriers on the first RU. The mapping method may be predefined, for example, mirror inversion, or may be obtained by using a predefined mapping relationship. The mapping method may alternatively be carried in the HE MU PPDU in a form of third indication information. Specifically, a plurality of mapping methods may be defined in advance, for example, Method 1: mirror inversion; Method 2: obtaining the mapping method by using a first mapping relationship; and Method 3: obtaining the mapping method by using the second mapping relationship.

Figure 7:
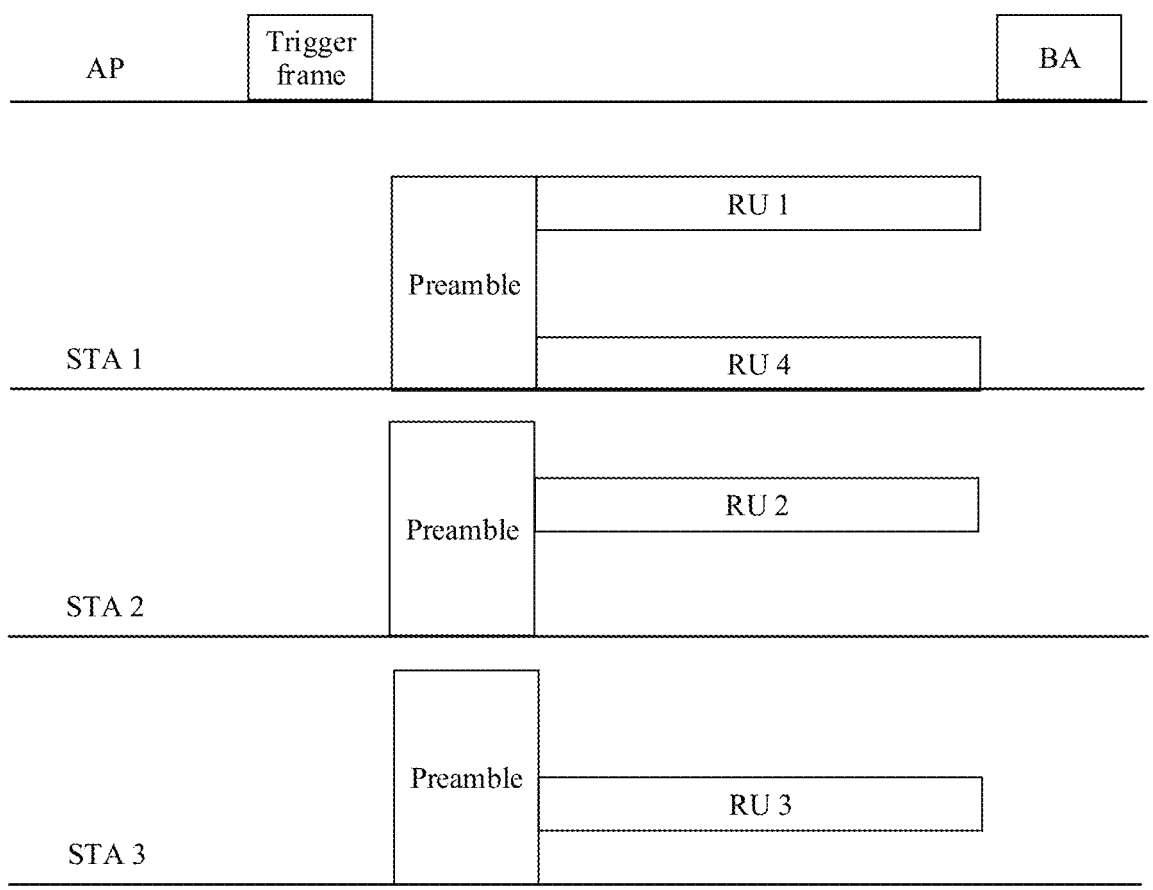
FIG. 7 shows that an AP allocates two RUs to a STA 1 by using a trigger frame.

In another specific embodiment, for example, the AP generates and sends a trigger frame, where the trigger frame is used to allocate different RUs to STAs. The STAs send uplink data to the AP on the allocated RUs. Correspondingly, the AP receives data on the corresponding RUs. In this embodiment of this application, the AP allocates a plurality of RUs to a same STA. As shown in FIG. 7, the AP allocates a first RU and a fourth RU to a STA 1, and the STA 1 sends uplink data on the first RU and the fourth RU. Details of this specific embodiment are described below.

Figure 8:
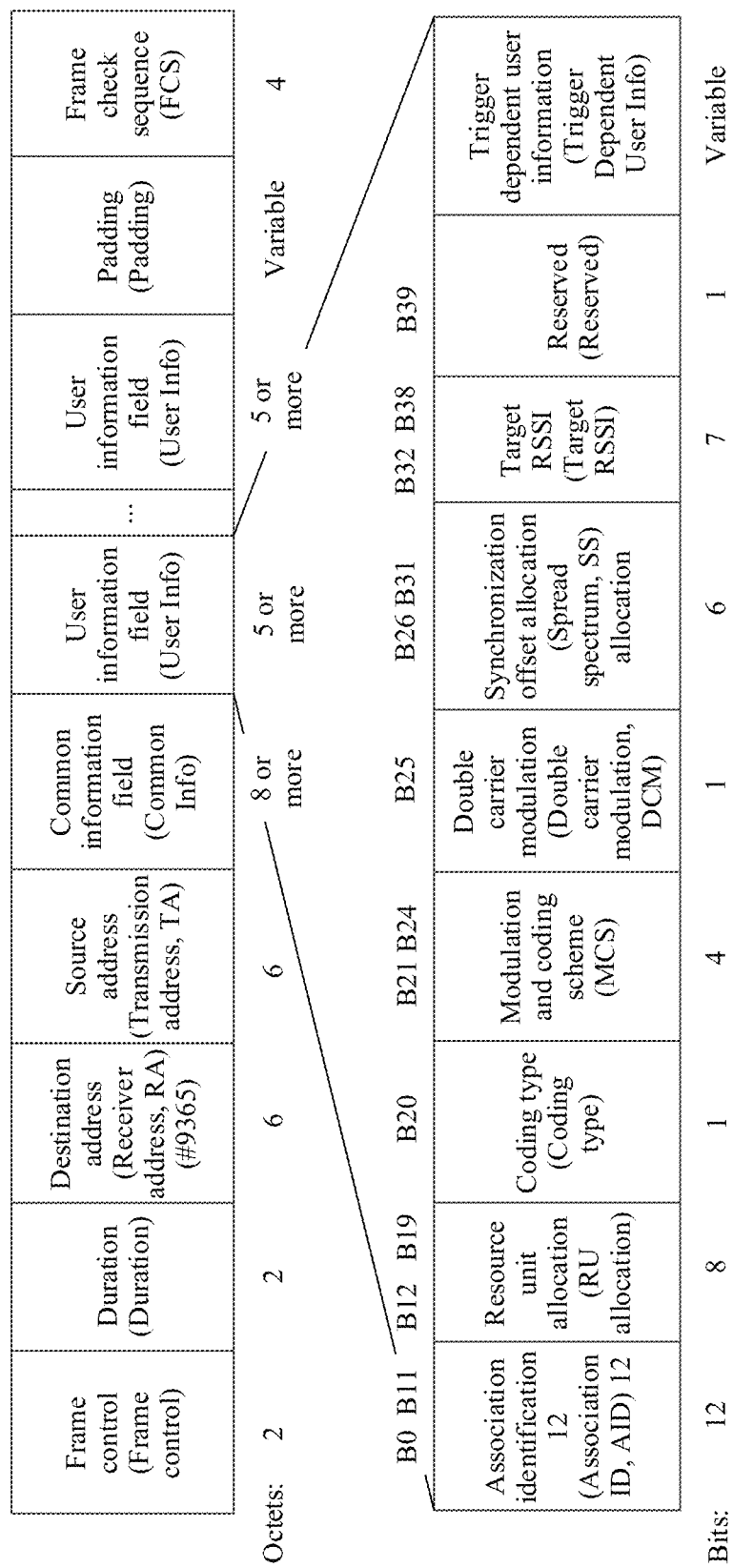
FIG. 8 shows a frame structure of a trigger frame.

As shown in FIG. 8, the AP generates and sends the trigger frame, where the trigger frame includes one common information field and a plurality of user information fields. Each user information field includes one user identifier subfield and one resource unit allocation (RU Allocation) subfield. Each user information field is used to allocate, by using the user identifier subfield and the RU Allocation subfield, an RU indicated by the RU Allocation subfield to a STA identified by the user identifier subfield. To allocate a plurality of RUs to a same STA, the trigger frame may include a plurality of user information fields whose user identifier subfield values are the same, in other words, values of user identifier subfields in these user information fields are the same.

Further, locations of a plurality of user information fields in which a plurality of RUs allocated to a STA are located are contiguous, so that the STA ends reading of the trigger frame as soon as possible, and starts to prepare data for sending.

Further, in this embodiment of this application, the AP may indicate, in the trigger frame, that a plurality of RUs allocated to a STA are used by the STA to send same data, and the STA sends the same data by using the plurality of RUs, so as to improve data transmission robustness. Specifically, the AP adds fourth indication information to the trigger frame, where the fourth indication information is used to indicate the STA to send the same data by using a plurality of different RUs.

More specifically, the fourth indication information may be located in a user information field of the trigger frame. When the fourth indication information is set to a preset special value, data sent on an RU indicated by an RU Allocation subfield in the user information field is the same as data sent on a previous RU or a next RU allocated to a same STA. As shown in FIG. 8, the user information field of the trigger frame includes: a user identification subfield, a resource unit allocation subfield, a coding type subfield, a modulation and coding scheme (MCS) subfield, a double carrier modulation subfield, and a synchronization offset allocation (SS Allocation) subfield, a target RSSI (Target RSSI) subfield, a reserved subfield, and a trigger dependent user information (Trigger Dependent User Info) subfield. Optionally, the fourth indication information may be located in a reserved subfield B39. The B39 whose value is a preset special value indicates that data sent on an RU indicated by an RU Allocation subfield in a user information field in which the fourth indication information is located is the same as data sent on a previous RU or a next RU allocated to a same STA. Optionally, the fourth indication information may alternatively be located in an MCS subfield. Because valid values of the MCS subfield are 0 to 11, any value in special values 12 to 15 of the MCS subfield may be used as the preset special value of the fourth indication information. An MCS subfield whose value is any value in 12 to 15 indicates that data sent on an RU indicated by an RU Allocation subfield in a user information field in which the MCS subfield is located is the same as data sent on a previous RU or a next RU allocated to a same STA. Optionally, the fourth indication information may alternatively be located in an SS Allocation subfield. The SS Allocation subfield further includes two subfields: Starting Spatial Stream and Number Of Spatial Stream, and a valid value range of the SS Allocation subfield is Starting Spatial Stream+Number Of Spatial Stream<=7. Therefore, when Starting Spatial Stream+Number Of Spatial Stream>7, a combination of values of the two subfields is invalid, and any combination of the invalid values may be used as the preset special value of the fourth indication information. (Starting Spatial Stream+Number Of Spatial Stream) whose value combination is the preset special value indicates that data sent on an RU indicated by an RU Allocation subfield in a user information field in which Starting Spatial Stream and Number Of Spatial Stream are located is the same as data sent on a previous RU or a next RU allocated to a same STA. The following table lists combinations of the invalid values.

| Starting Spatial Stream | Number Of Spatial Stream |
| --- | --- |
| 1 | 7 |
| 2 | 6 |
| 2 | 7 |
| 3 | 5 |
| 3 | 6 |
| 3 | 7 |
| 4 | 4 |
| 4 | 5 |
| 4 | 6 |
| 4 | 7 |
| 5 | 3 |
| 5 | 4 |
| 5 | 5 |
| 5 | 6 |
| 5 | 7 |
| 6 | 2 |
| 6 | 3 |
| 6 | 4 |
| 6 | 5 |
| 6 | 6 |
| 6 | 7 |
| 7 | 1 |
| 7 | 2 |
| 7 | 3 |
| 7 | 4 |
| 7 | 5 |
| 7 | 6 |
| 7 | 7 |

Optionally, the fourth indication information may alternatively be located in a Target RSSI subfield, and valid values of the Target RSSI subfield are 0 to 90 and 127. Therefore, any value in invalid values 91 to 126 of the Target RSSI subfield may be used as the preset special value of the fourth indication information. To be specific, the Target RSSI subfield whose value is any value in 91 to 126 indicates that data sent on an RU indicated by an RU Allocation subfield in a user information field in which the Target RSSI subfield is located is the same as data sent on a previous RU or a next RU allocated to a same STA. Optionally, the fourth indication information may alternatively be located in a Trigger Dependent User Info subfield, and a subfield may be added in the Trigger Dependent User Info subfield to carry the fourth indication information.

In the foregoing description, each subfield that is in the user information field of the trigger frame and whose value is the preset special value indicates that data sent on an RU indicated by an RU Allocation subfield in the user information field in which the subfield is located is the same as data sent on a previous RU or a next RU allocated to a same STA. In addition, each subfield that is in the user information field of the trigger frame and whose value is the preset special value further indicates that a parameter that originally needs to be indicated by the subfield is the same as a parameter indicated by the subfield in a previous or next user information field allocated to the same STA. For example, if the AP divides an entire communication resource into four RUs, and allocates a first RU and a fourth RU in the four RUs to the STA 1, the STA 1 sends uplink data to the AP on the allocated first RU and the allocated fourth RU. If a value of a STA-ID of the STA 1 is 5, the AP may set values of a STA-ID in a first user information field and a STA-ID in a fourth user information field in the trigger frame to 5.

Further, if a value of a Target RSSI subfield in the fourth user information field is 91, the STA 1 is indicated to send same data to the AP on the first RU and the fourth RU. In addition, that the value of the Target RSSI subfield in the fourth user information field is 91 further indicates that the value of the Target RSSI subfield in the fourth user information field is the same as a value of a Target RSSI subfield in the first user information field. Similarly, content indicated by another subfield in the user information field of the trigger frame is similar to that in the foregoing subfields, and details are not described herein again.

Further, if the AP indicates the STA to send same data on different RUs, the AP allocates RUs of a same size to the STA when allocating RUs to the STA. Specifically, the user information field of the trigger frame further includes a resource allocation (RU Allocation) subfield, and resources indicated by RU Allocation subfields in the user information fields whose user identifier subfield values are the same. For example, sizes of the first RU and the fourth RU are the same. Assuming that the value of the STA-ID of the STA 1 is 5, the values of the STA-ID in the first user information field and the STA-ID in the fourth user information field in the trigger frame that is generated and sent by the AP are both 5. In addition, the value of the Target RSSI subfield in the fourth user information field is 91 (the value of the Target RSSI subfield being 91 indicates the STA 1 to send same data to the AP on the first RU and the fourth RU).

S202: The transmit end sends the first frame.

In S202, the transmit end sends the first frame generated in S201.

S203: A receive end receives the first frame, where the first frame includes the plurality of user information fields, each user information field includes the user identifier subfield and is used to allocate the resource to the user identified by the user identifier subfield, and the plurality of user information fields include the user information fields whose user identifier subfield values are the same.

In S203, the receive end receives the first frame in S201.

S204: The receive end transmits data on the resource allocated to the receive end.

In S204, because the resource is allocated, in the first frame in S201, to the user identified by the user identifier subfield, the receive end user transmits data on the resource allocated to the receive end user. As described in S201, if the AP generates an HE-MU-PPDU in S201, the HE-MU-PPDU is used to allocate RUs at different locations to the STAs, the AP sends downlink data to the STAs on the RUs, and correspondingly, the STAs receive data on the corresponding RUs; or if the AP generates a trigger frame in S201, the trigger frame is used to allocate different RUs to the STAs, and the STAs send uplink data to the AP on the allocated RUs. Because different resources are allocated to a same user in the first frame, a same receive end user transmits data on different resources in S204. For example, a STA to which a plurality of RUs are allocated receives data on a plurality of corresponding RUs. For another example, a STA to which a plurality of RUs are allocated sends uplink data to the AP on the plurality of allocated RUs.

Further, the HE MU PPDU further carries second indication information, where the second indication information is used to indicate the AP to send same data on RUs at different locations to a same STA. In S204, the receive end user receives and combines the same data on the RUs at different locations, so as to improve robustness of receiving data by the receive end.

Further, the trigger frame further carries fourth indication information, where the fourth indication information is used to indicate the user to send same data to the AP by using a plurality of RUs at different locations, so as to improve robustness of sending data by the receive end.

The resource allocation method in the embodiments of this application is described above. The resource allocation apparatus in the embodiments of this application is described below. The resource allocation apparatus in the embodiments of this application includes a resource allocation apparatus applied to a transmit end and a resource allocation apparatus applied to a receive end. It should be understood that, the resource allocation apparatus applied to the transmit end is the transmit end in the foregoing method, and has any function of the transmit end in the foregoing method; and the resource allocation apparatus applied to the receive end is the receive end in the foregoing method, and has any function of the receive end in the foregoing method.

Figure 9:
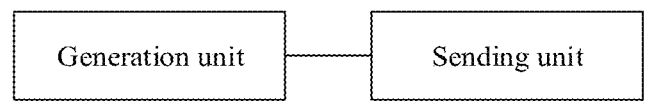
FIG. 9 shows a structure of a resource allocation apparatus applied to a transmit end.

As shown in FIG. 9, the resource allocation apparatus applied to the transmit end includes:

a generation unit, configured to generate a first frame, where the first frame includes a plurality of pieces of user information, each piece of user information includes one user identifier and is used to allocate a resource to a user identified by the user identifier, and the plurality of pieces of user information include pieces of user information having a same user identifier; and a sending unit, configured to send the first frame.

According to the resource allocation apparatus applied to the transmit end provided in this embodiment of this application, the plurality of pieces of user information in the first frame include the pieces of user information having a same user identifier, so that a plurality of resources at different locations are allocated to a same user. The resource allocation apparatus applied to the transmit end provided in this embodiment of this application is the transmit end in the foregoing method, and the resource allocation apparatus has any function of the transmit end in the foregoing method. For specific details, refer to the foregoing method. Details are not described herein again.

Figure 10:
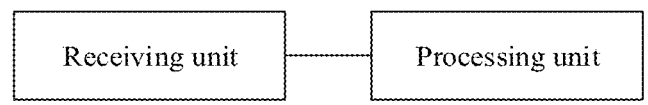
FIG. 10 shows a structure of a resource allocation apparatus applied to a receive end.

As shown in FIG. 10, the resource allocation apparatus applied to the receive end includes:

a receiving unit, configured to receive a first frame, where the first frame includes a plurality of pieces of user information, each piece of user information includes one user identifier and is used to allocate a resource to a user identified by the user identifier, and the plurality of pieces of user information include pieces of user information having a same user identifier; and a processing unit, configured to schedule a user to transmit data on an allocated resource.

The resource allocation apparatus applied to the receive end provided in this embodiment of this application receives the first frame, where the plurality of pieces of user information in the first frame include the pieces of user information having a same user identifier, and the resource allocation apparatus applied to the receive end transmits data on a plurality of allocated resources at different locations based on an indication of the first frame. The resource allocation apparatus applied to the receive end provided in this embodiment of this application is the receive end in the foregoing method, and the resource allocation apparatus has any function of the receive end in the foregoing method. For specific details, refer to the foregoing method. Details are not described herein again.

The foregoing describes the resource allocation apparatus applied to the transmit end and the resource allocation apparatus applied to the receive end in the embodiments of this application. The following describes possible product forms of the resource allocation apparatus applied to the transmit end and the resource allocation apparatus applied to the receive end. It should be understood that any form of product having the features of the resource allocation apparatus applied to the transmit end in FIG. 9 and any form of product having the features of the resource allocation apparatus applied to the receive end in FIG. 10 fall within the protection scope of this application. It should be further understood that the following description is merely an example, and a product form of the resource allocation apparatus applied to the transmit end and a product form of the resource allocation apparatus applied to the receive end in the embodiments of this application are not limited thereto.

As a possible product form, the resource allocation apparatus applied to the transmit end and the resource allocation apparatus applied to the receive end in the embodiments of this application may be implemented by using general bus architectures.

The resource allocation apparatus applied to the transmit end includes a processor and a transceiver that is internally connected to and communicates with the processor. The processor is configured to generate a first frame, where the first frame includes a plurality of user information fields, each user information field includes one user identifier subfield and is used to allocate a resource to a user identified by the user identifier subfield, and the plurality of user information fields include user information fields whose user identifier subfield values are the same. The transceiver is configured to send the first frame. Optionally, the resource allocation apparatus applied to the transmit end may further include a memory. The memory is configured to store instructions executed by the processor.

The resource allocation apparatus applied to the receive end includes a processor and a transceiver that is internally connected to and communicates with the processor. The transceiver is configured to receive a first frame, where the first frame includes a plurality of user information fields, each user information field includes one user identifier subfield and is used to allocate a resource to a user identified by the user identifier subfield, and the plurality of user information fields include user information fields whose user identifier subfield values are the same. The processor is configured to schedule a user to transmit data on a resource allocated to the user. Optionally, the resource allocation apparatus applied to the receive end may further include a memory. The memory is configured to store instructions executed by the processor.

As a possible product form, the resource allocation apparatus applied to the transmit end and the resource allocation apparatus applied to the receive end in the embodiments of this application may be implemented by using general-purpose processors.

The general-purpose processor for implementing the resource allocation apparatus applied to the transmit end includes a processing circuit and an output interface that is internally connected to and communicates with the processing circuit. The processing circuit is configured to generate a first frame, where the first frame includes a plurality of user information fields, each user information field includes one user identifier subfield and is used to allocate a resource to a user identified by the user identifier subfield, and the plurality of user information fields include user information fields whose user identifier subfield values are the same. The output interface is configured to send the first frame. Optionally, the general-purpose processor may further include a storage medium. The storage medium is configured to store instructions executed by the processing circuit.

A general-purpose processor for implementing the resource allocation apparatus applied to the receive end includes a processing circuit and an input interface that is internally connected to and communicates with the processing circuit. The input interface is configured to receive a first frame, where the first frame includes a plurality of user information fields, and each user information field includes one user identifier subfield and is used to allocate a resource to a user identified by the user identifier subfield, and the plurality of user information fields include user information fields whose user identifier subfield values are the same. The processing circuit is configured to schedule a user to transmit data on a resource allocated to the user. Optionally, the general-purpose processor may further include a storage medium. The storage medium is configured to store instructions executed by the processing circuit.

As a possible product form, the resource allocation apparatus applied to the transmit end and the resource allocation apparatus applied to the receive end in the embodiments of this application may alternatively be implemented by using the following components: one or more FPGAs (field programmable gate arrays), PLDs (programmable logic devices), controllers, state machines, gate logic, discrete hardware components, any other suitable circuits, or any combination of circuits that can perform various functions described in this application.

It should be understood that the resource allocation apparatus applied to the transmit end and the resource allocation apparatus applied to the receive end in the foregoing product forms respectively have any function of the transmit end and any function of the receive end in the foregoing method embodiments, and details are not described herein again.

It should be understood that the term "and/or" in this specification describes only an association relationship between associated objects and represents that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may be aware that, in combination with the examples described in the embodiments disclosed in this specification, method steps and units can be implemented by electronic hardware, computer software, or a combination thereof. To clearly describe interchangeability between hardware and software, the foregoing has generally described steps and composition of each embodiment based on functions. Whether the functions are performed by hardware or software depends on particular applications and design constraints of the technical solutions. A person of ordinary skill in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing described system, apparatuses, and units, refer to a corresponding process in the foregoing method embodiments, and details are not described herein again.

In the several embodiments provided in this application, it should be understood that the disclosed system, apparatus, and method may be implemented in another manner. For example, the described apparatus embodiments are merely examples. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or the communication connections between the apparatuses or the units may be implemented in an electrical form, a mechanical form, or another form.

The units described as separate parts may or may not be physically separate, and parts displayed as units may or may not be physical units, may be located in one location, or may be distributed on a plurality of network units. A part or all of the units may be selected based on actual requirements to achieve the objectives of the solutions in the embodiments of this application.

In addition, function units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software function unit and is sold or used as an independent product, the integrated unit may be stored in a computer-readable storage medium. Based on such an understanding, the technical solutions in this application essentially, or the part contributing to the conventional technology, or all or a part of the technical solutions may be implemented in a form of a software product. The computer software product is stored in a storage medium and includes several instructions for instructing a computer device (which may be a personal computer, a server, a network device, or the like) to perform all or a part of the steps of the methods in the embodiments of this application. The foregoing storage medium includes any medium that can store program code, for example, a USB flash drive, a removable hard disk, a read-only memory (read-only memory, ROM), a random access memory (random access memory, RAM), a magnetic disk, or an optical disc.

The foregoing descriptions are merely specific embodiments of this application, but are not intended to limit the protection scope of this application. Any equivalent modification or replacement readily figured out by a person skilled in the art within the technical scope disclosed in this application shall fall within the protection scope of this application. Therefore, the protection scope of this application shall be subject to the protection scope of the claims.

What is claimed is:

1. A resource allocation method, comprising:
generating a first frame, wherein the first frame comprises a plurality of user information fields, each user information field of the plurality of user information fields comprises one user identifier subfield and is used to allocate a resource to a user identified by the user identifier subfield, and two or more user information fields of the plurality of user information fields have corresponding values of corresponding user identifier subfields that are the same; and
sending the first frame,
wherein each user information field of the plurality of user information fields further comprises fourth indication information, and the fourth indication information is usable to indicate a user to send a same data by a plurality of resources at different locations.

2. The method according to claim 1, wherein locations of the two or more user information fields in the plurality of user information fields that have corresponding values of corresponding user identifier subfields that are the same are contiguous.

3. The method according to claim 1, wherein the first frame is a high efficiency (HE) multi user (MU) physical layer protocol data unit (PPDU), the HE MU PPDU comprises an HE-SIG-B field, the HE-SIG-B field comprises the plurality of user information fields.

4. The method according to claim 3, wherein each user information field of the plurality of user information fields further comprises second indication information, and the second indication information is used to indicate to send a same data to a same user on resources at different locations.

5. The method according to claim 4, wherein the second indication information is located in an MCS subfield of a first user information field of the plurality of user information fields.

6. The method according to claim 4, wherein the HE-SIG-B field further comprises a resource allocation subfield, and resources indicated by resource allocation subfields corresponding to the two or more user information fields that have corresponding values of user identifier subfields that are the same have a same size.

7. The method according to claim 1, wherein the first frame is a trigger frame, the trigger frame comprises the plurality of user information fields.

8. The method according to claim 7, wherein the fourth indication information is located in a reserved subfield of a first user information field of the plurality of user information fields.

9. The method according to claim 8, wherein each user information field of the plurality of user information fields further comprises a resource allocation subfield, and resources indicated by resource allocation subfields in the two or more user information fields that have corresponding values of user identifier subfields that are the same have a same size.

10. A resource allocation method, comprising:
receiving a first frame, wherein the first frame comprises a plurality of user information fields, each user information field of the plurality of user information fields comprises one user identifier subfield and is used to allocate a resource to a user identified by the user identifier subfield, and two or more user information fields of the plurality of user information fields have corresponding values of corresponding user identifier subfields that are the same; and
transmitting data on the allocated resource,
wherein each user information field of the plurality of user information fields further comprises fourth indication information, and the fourth indication information is usable to indicate a user to send a same data by a plurality of resources at different locations.

11. The method according to claim 10, wherein locations of the two or more user information fields in the plurality of user information fields that have corresponding values of corresponding user identifier subfields that are the same are contiguous.

12. The method according to claim 10, wherein the first frame is a high efficiency (HE) multi user (MU) physical layer protocol data unit (PPDU), the HE MU PPDU comprises an HE-SIG-B field, the HE-SIG-B field comprises the plurality of user information fields.

13. The method according to claim 12, wherein each user information field of the plurality of user information fields further comprises second indication information, and the second indication information is used to indicate to send a same data to a same user on resources at different locations.

14. The method according to claim 13, wherein the second indication information is located in an MCS subfield of a first user information field of the plurality of user information fields.

15. The method according to claim 13, wherein the HE-SIG-B field further comprises a resource allocation subfield, and resources indicated by resource allocation subfields corresponding to the two or more user information fields that have corresponding values of user identifier subfields that are the same have a same size.

16. The method according to claim 10, wherein the first frame is a trigger frame, the trigger frame comprises the plurality of user information fields.

17. The method according to claim 16, wherein the fourth indication information is located in a reserved subfield of a first user information field of the plurality of user information fields.

18. The method according to claim 17, wherein each user information field of the plurality of user information fields further comprises a resource allocation subfield, and resources indicated by resource allocation subfields in the two or more user information fields that have corresponding values of user identifier subfields that are the same have a same size.

19. An apparatus, comprising: at least one processor and a memory storing instructions that when executed by the at least one processor, cause the apparatus to:

generate a first frame, wherein the first frame comprises a plurality of user information fields, each user information field of the plurality of user information fields comprises one user identifier subfield and is used to allocate a resource to a user identified by the user identifier subfield, and two or more user information fields of the plurality of user information fields have corresponding values of corresponding user identifier subfields that are the same; and send the first frame;

wherein each user information field of the plurality of user information fields further comprises fourth indication information, and the fourth indication information is usable to indicate a user to send a same data by a plurality of resources at different locations.

20. The apparatus according to claim 19, wherein locations of the two or more user information fields in the plurality of user information fields that have corresponding values of corresponding user identifier subfields that are the same are contiguous.

* * * * *